United States Patent [19]

Gimpel et al.

[11] Patent Number: 4,510,284

[45] Date of Patent: Apr. 9, 1985

[54] HIGH SOLIDS BAKING FINISHES

[75] Inventors: Jürgen Gimpel, Ludwigshafen; Klaus-Peter Jäckel, Limburgerhof; Hans Sander, Ludwigshafen, all of Fed. Rep. of Germany

[73] Assignee: BASF Aktiengesellschaft, Fed. Rep. of Germany

[21] Appl. No.: 638,540

[22] Filed: Aug. 7, 1984

Related U.S. Application Data

[63] Continuation of Ser. No. 446,065, Dec. 1, 1982, abandoned.

[30] Foreign Application Priority Data

Dec. 4, 1981 [DE] Fed. Rep. of Germany ....... 3148051

[51] Int. Cl.$^3$ ............................................. C08F 20/04
[52] U.S. Cl. ..................................... 524/379; 524/315; 524/318; 524/366; 524/376; 524/377; 524/378; 524/390; 524/512; 524/558; 525/162; 526/317
[58] Field of Search ............... 524/315, 318, 376, 377, 524/378, 366, 374, 390, 512, 558

[56] References Cited

U.S. PATENT DOCUMENTS

| Re. 27,151 | 6/1971 | Hicks .................................. 526/317 |
| 2,681,897 | 6/1954 | Frazier et al. ....................... 260/45.2 |
| 2,853,463 | 9/1958 | Gaylord .............................. 260/45.2 |
| 2,900,359 | 8/1959 | Chapin et al. ......................... 260/43 |
| 3,326,859 | 6/1967 | Semer ................................. 525/384 |
| 3,370,050 | 2/1968 | Seiner ................................. 526/317 |
| 3,853,822 | 12/1974 | Brod et al. .......................... 526/317 |
| 3,896,070 | 7/1975 | Tummler et al. .................... 526/224 |
| 3,926,888 | 12/1975 | Cheung et al. ...................... 524/832 |

FOREIGN PATENT DOCUMENTS

| 1932587 | 1/1973 | Fed. Rep. of Germany . |
| 2351606 | 7/1977 | Fed. Rep. of Germany . |

OTHER PUBLICATIONS

Industrial & Engineering Chemistry 53 (1961), pp. 466-488.

Primary Examiner—Joseph L. Schofer
Assistant Examiner—Bernard Lipman
Attorney, Agent, or Firm—Keil & Weinkauf

[57] ABSTRACT

Baking finishes having a high solids content contain, as the binder, a copolymer of one or more mono-acrylate or monomethacrylate of an alkanediol, an ester of acrylic or methacrylic acid whose homopolymer has a glass transition temperature of below −40° C., an ester of acrylic acid or methacrylic acid whose homopolymer has a glass transition temperature of above 35° C. and acrylic acid or methacrylic acid, which copolymer has a Fikentscher K value of from 13 to 17 and may or may not be used in combination with conventional aminoplast precondensates having a crosslinking action. These baking finishes are particularly useful as binders for automotive finishes.

12 Claims, No Drawings

HIGH SOLIDS BAKING FINISHES

This application is a continuation of application Ser. No. 446,065, filed on Dec. 1, 1982, now abandoned.

The present invention relates to high-solids baking finishes based on hydroxyl-containing copolymers, which may or may not be used in combination with conventional low molecular weight or macromolecular crosslinking agents and which are employed to produce weathering-resistant coatings.

U.S. Pat. Nos. 2,853,463, 2,681,897 and 2,900,359, German Laid-Open Application DOS No. 1,932,587 and Industrial & Engineering Chemistry 53 (1961), 466–488 disclose baking finishes which contain a hydroxyl-containing copolymer and an aminoplast resin. German Pat. No. 2,351,606 discloses hydroxyl-containing copolymers which, when used as surface-coating binders, can be mixed with a high proportion of fillers and are very safe from overbaking. However, these copolymers are unsuitable as binders for clear top coats, which require to have, simultaneously, good weathering resistance, good mechanical performance characteristics and a high solids content at the spraying viscosity. If the molecular weight (i.e. the K value) of the polymers of the above prior art is reduced, the general performance characteristics deteriorate, and in particular the weathering resistance becomes much lower.

It is an object of the present invention to provide special hydroxyl-containing copolymers which are useful as binders for high-solids clear top coats and exhibit better weathering resistance than the prior art products, coupled with good film hardness and good resilience.

We have found that this object is achieved by using, as binders in baking finishes useful as top coats in multilayer coatings, hydroxyl-containing copolymers which may be employed in combination with conventional aminoplast precondensates having a crosslinking action and which contain, as copolymerized units, (A) from 18 to 27% by weight of one or more monoacrylate or monomethacrylate of an alkanediol of 2 to 4 carbon atoms, (B) from 28 to 45% by weight of an acrylate or methacrylate of a monoalcohol of 3 to 8 carbon atoms, the homopolymer of which ester has a glass transition temperature of below $-40°$ C., (C) from 32 to 50% by weight of an acrylate or methacrylate whose homopolymer has a glass transition temperature of above 35° C. and (D) from 0.5 to 3% by weight of acrylic or methacrylic acid, with the proviso that the sum of the percentages given under (A) to (D) is 100 and the Fikentscher K value of the copolymer is from 13 to 17.

The novel baking finishes containing these copolymers have a high solids content at the spraying viscosity and give coatings having very good weathering resistance; they are particularly suitable for use as a clear top coat on metallic finishes. They exhibit both great film hardness and good resilience. The combination of these properties is not obtainable with the finishes of the prior art described above.

The following details may be noted concerning the components from which the copolymers used in the novel baking finishes are synthesized:

(A) Suitable components A are monoesters of acrylic acid or methacrylic acid with diols of 2 to 4 carbon atoms, for example hydroxyethyl acrylate, hydroxypropyl acrylate, butanediol monoacrylate, hydroxyethyl methacrylate, hydroxypropyl methacrylate and hydroxybutyl methacrylate. Hydroxyethyl acrylate and hydroxypropyl acrylate are preferred. Component (A) is present as polymerized units in the copolymer in an amount of from 18 to 27, preferably from 18 to 24, % by weight. If the amount drops below 18% by weight, resilience and adequate hardness of the finishes are no longer achieved simultaneously. If on the other hand the amount of component A in the copolymer exceeds 27% by weight, the weathering resistance decreases substantially.

(B) Suitable components B are esters of acrylic acid or methacrylic acid with monoalcohols of 3 to 8 carbon atoms, whose homopolymer has a glass transition temperature of below $-40°$ C., for example propyl acrylate, n-butyl acrylate, 2-ethylhexyl acrylate or 2-ethylhexyl methacrylate. n-Butyl acrylate and 2-ethylhexyl acrylate are preferred. Component (B) is present as polymerized units in the copolymer in an amount of from 28 to 45, preferably 28 to 40, % by weight. If the amount drops below 28% by weight, the weathering resistance of the film decreases substantially. If on the other hand it exceeds 45% by weight, the film hardness is no longer adequate.

(C) Suitable components (C) are esters of acrylic acid or methacrylic acid whose homopolymer has a glass transition temperature of above 35° C., for example tert.-butyl acrylate, methyl methacrylate and ethyl methacrylate. Component (C) is present as polymerized units in the copolymer in an amount of from 32 to 50, preferably from 40 to 50, % by weight. If the amount drops below 32% by weight, the films obtained are insufficiently hard. If on the other hand it exceeds 50% by weight, the weathering resistance of the film decreases substantially.

(D) From 0.5 to 3% by weight of acrylic acid or methacrylic acid is used as component (D). If component (D) is omitted, the baking temperature is increased and the gloss reduced. If the amount of component (D) in the copolymer is increased to above 3% by weight, the shelf life of the finish drops.

The molecular weight of the copolymers, expressed in terms of the Fikentscher K value (Cellulosechemie 13 (1932), 58) is from 13 to 17, preferably from 13 to 15. It is true that if the K value drops below 13, the solids content of the sprayable finish can be increased, for a given viscosity, but the weathering resistance decreases substantially. At a K value above 17, the weathering resistance may be adequate, but the maximum solids content achievable at a sprayable viscosity is about 40% by weight or less.

The copolymers are in general produced by conventional known polymerization processes, for example by free radical solution, suspension or mass polymerization; for this, the conventional free radical polymerization initiators can in general be used, for example peroxides or azo compounds, with or without regulators, for example mercaptans, alcohols or other compounds containing labile hydrogen, for example cumene. Solution polymerization is a particularly advantageous method of preparing the copolymers.

The compolymers may be used in solution, i.e. in conventional solvents which may or may not have been present during the polymerization stage, for example alcohols, aromatics, esters, ether-esters or mixtures of these solvents with one another or with other solvents, diluents and/or plasticizers.

Suitable aminoplast precondensates, having a crosslinking action, which may or may not be used together with the copolymer, in amounts of not more than 60, preferably from 10 to 40, especially from 25 to 40, % by weight based on the copolymer, are in particular those which contain carboxamide N-methylol-ether groups. The preparation of aminoplast precondensates which are suitable for use in the novel binders is described, for example, in Houben-Weyl, Methoden der organischen Chemie (1963), Volume 14/2, page 319 et seq.

In addition to the binder components, the novel baking finishes may contain other auxiliaries, such as soluble dyes, UV stabilizers, hardening catalysts, solvents, leveling improvers and other assistants conventionally used in finishes, for example solutions, in solvents, of low molecular weight organic or inorganic acids, e.g. phosphoric acid, salicylic acid and the like.

The finishes are applied to the substrate by, for example, spraying, as described in Kittel, Handbuch der Lacke und Beschichtungen, Volume VII, pages 59–95.

The novel baking finishes may be used, for example, in the preparation of automotive finishes, especially as high-solids clear finishes for 2-coat metallics.

The baking of the novel finishes is in general carried out at from 80° to 180° C., especially from 120° to 150° C., and—depending on the temperature—for from 10 to 120, especially from 20 to 60, minutes, in apparatus appropriate for the purpose.

In the Examples, parts and percentages are by weight, unless stated otherwise.

PREPARATION OF THE COPOLYMERS

Polymer 1

A feed mixture consisting of 120 parts of hydroxypropyl acrylate, 234 parts of n-butyl acrylate, 237 parts of tert.-butyl acrylate, 9 parts of acrylic acid and 9 parts of tert.-butyl perpenzoate is added over 2 hours, under nitrogen, to an initial charge of 200 parts of n-butanol and 200 parts of a hydrocarbon mixture having an aromatics content of 98% and a boiling range of from 163° to 180° C. (for example $^R$Solvesso 100), at 125° C. Polymerization is continued for a further hour at 125° C., 6 parts of tert.-butyl perbenzoate are then added and the mixture polymerized for a further hour at 125° C. A clear polymer solution, having a solids content of 60.8%, is obtained, the polymer contained therein having an acid number (based on 100% pure product) of 16.2 and a K value of 15.0.

Polymer 2

A feed mixture consisting of 175.5 parts of hydroxypropyl acrylate, 201.5 parts of n-butyl acrylate, 263 parts of tert.-butyl acrylate, 9 parts of acrylic acid and 9 parts of tert.-butyl perbenzoate is added over 2 hours, under nitrogen, to an initial charge of 200 parts of n-butanol and 200 parts of the above hydrocarbon mixture (Solvesso 100) at 125° C. Polymerization is continued for a further hour at 125° C., 6 parts of tert.-butyl perbenzoate are then added and the mixture polymerized for a further hour at 125° C. A clear polymer solution, having a solids content of 62.6%, is obtained, the polymer contained therein having an acid number (based on 100% pure product) of 15.7 and a K value of 15.3.

Polymer 3

A feed mixture consisting of 120 parts of hydroxypropyl acrylate, 174 parts of n-butyl acrylate, 297 parts of tert.-butyl acrylate, 9 parts of acrylic acid, 9 parts of tert.-butyl perbenzoate and 24 parts of tert.-dodecylmercaptan is added over 2 hours, under nitrogen, to an initial charge of 200 parts of n-butanol and 200 parts of the above hydrocarbon mixture (Solvesso 100) at 125° C. Polymerization is continued for a further hour at 125° C., 6 parts of tert.-butyl perbenzoate are then added and the mixture polymerized for a further hour at 125° C. A clear polymer solution, having a solids content of 59.9%, is obtained, the polymer contained therein having an acid number (based on 100% pure product) of 22.2 and a K value of 13.8.

Polymer 4

(Comparative Example, with higher K value)

A feed mixture consisting of 954 parts of n-butyl acrylate, 540 parts of methyl methacrylate, 270 parts of hydroxypropyl acrylate, 36 parts of acrylic acid 2.7 parts of mercaptoethanol, 16.7 parts of tert.-butyl perbenzoate and 67.2 parts of the hydrocarbon mixture (Solvesso 100) is added over 3 hours, under nitrogen, to an initial charge of 1,099 parts of the above hydrocarbon mixture (Solvesso 100) at 130° C. The mixture is polymerized for a further 30 minutes at 130° C., 8.5 parts of tert.-butyl perbenzoate in 33.8 parts of hydrocarbon mixture (Solvesso 100) are added, and polymerization is continued for a further hour at 130° C. Another 9 parts of tert.-butyl perbenzoate are then added and the mixture is finally polymerized for one hour at 130° C. A clear polymer solution, having a solids content of 60.6%, is obtained, the polymer contained therein having an acid number (based on 100% pure product) of 18.9 and a K value of 18.3. Polymer 5 (Comparative Example, with lower K value of the polymer and higher contents of tert.-butyl acrylate and hydroxypropyl acrylate)

A feed mixture consisting of 210 parts of hydroxypropyl acrylate, 381 parts of tert.-butyl acrylate, 9 parts of acrylic acid and 12 parts of tert.-butyl perbenzoate is added over 2 hours, under nitrogen, to an initial charge of 200 parts of n-butanol and 200 parts of the above hydrocarbon mixture (Solvesso 100) at 155° C. The mixture is polymerized for a further hour at 155° C., 6 parts of tert.-butyl perbenzoate are then added and polymerization is continued for a further hour at 155° C. A clear polymer solution, having a solids content of 61.5%, is obtained, the polymer contained therein having an acid number (based on 100% pure product) of 14.8 and a K value of 12.

Polymer 6

(Comparative Example with lower K value)

A feed mixture consisting of 160 parts of hydroxypropyl acrylate, 232 parts of n-butyl acrylate, 396 parts of tert.-butyl acrylate, 12 parts of acrylic acid and 24 parts of tert-butyl perbenzoate is added over 2 hours, under nitrogen, to an initial charge of 200 parts of the above hydrocarbon mixture (Solvesso 100) at 155° C. The mixture is polymerized for a further hour at 155° C., 8 parts of tert.-butyl perbenzoate are then added and polymerization is continued for a further hour at 155° C. The mixture is cooled to 100° C. and 67 parts of n-butanol are added. A clear polymer solution, having a solids content of 74.8%, is obtained, the polymer contained therein having an acid number (based on 100% pure products) of 25.7 and a K value of 12.

PREPARATION OF THE CLEAR FINISHES

To prepare the clear finishes, the acrylate resins are combined with an isobutanol-etherified melamine-formaldehyde resin (for example $^R$Luwipal 015 from BASF AG) in accordance with the following recipe:

108.3 parts of acrylate resin (60% solids content)
63.6 parts of Luwipal 015 (55% solids content)
2.0 parts of silicon oil A, 1% strength in xylene
15-20 parts of hydrocarbon mixture (Solvesso 100)

At a spraying viscosity of 40 seconds (measured in a DIN cup 4), the finishes are sprayed wet on wet on a conventional base coat (cellulose acetobutyrate, acrylate resin and melamine resin) and baked for 30 minutes at 130° C. The dry film thickness of the base coat is about 10 μm whilst that of the top coat is 50-60 μm. The mechanical properties (pendulum hardness and Erichsen deep-drawing value), and the resistance to accelerated weathering in a Xenontest 1200 apparatus (DIN 53,209) of the baked finishes are tested. The test results are shown in the Table which follows.

TABLE

| Polymer No. | Solids content at the spraying viscosity | Pendulum hardness (DIN 53,157) [sec] | Erichsen deep-drawing value (DIN 52,156) [mm] | Appearance* after 2,000 hours' accelerated weathering |
|---|---|---|---|---|
| 1 | 50.1 | 123 | 6.2 | 0 to 1 |
| 2 | 50.0 | 158 | 6.6 | 1 |
| 3 | 50.4 | 137 | 6.8 | 0 to 1 |
| 4 | 41.6 | 123 | 6.0 | 0 to 1 |
| 5 | 50.4 | 193 | 2.2 | 5 |
| 6 | 50.1 | 136 | 5.6 | 5 |

*Note:
rating from 0 to 5
0: no blisters or cracks
5: entirely blistered and cracked

We claim:

1. A baking finish dissolved in conventional organic solvents, which baking finish is based on hydroxyl-containing copolymers and is useful as a top coat for multilayer coatings, wherein the binder of said finish is a copolymer obtained from
   (A) from 18 to 27% by weight of one or more monoacrylate or monomethacrylate of an alkanediol of 2 to 4 carbon atoms,
   (B) from 28 to 45% by weight of an acrylate or methacrylate of a monoalcohol of 3 to 8 carbon atoms, the homopolymer of which ester has a glass transition temperature of below −40° C.,
   (C) from 32 to 50% by weight of an acrylate or methacrylate whose homopolymer has a glass transition temperature of above 35° C. and
   (D) from 0.5 to 3% by weight of acrylic or methacrylic acid,
with the proviso that the sum of the percentages given under (A) to (D) is 100 and the Fikentscher K value of the copolymer is from 13 to 17.

2. The baking finish of claim 1, wherein component (A) in the copolymer is hydroxyethyl acrylate or hydroxypropyl acrylate.

3. The baking finish of claim 1, wherein component (B) in the copolymer is n-butyl acrylate or 2-ethylhexyl acrylate.

4. The baking finish of claim 1, wherein components (C) in the copolymer is tert.-butyl acrylate, methyl methacrylate or ethyl methacrylate.

5. The baking finish of claim 1, which contains from 10 to 40% by weight, based on copolymer, of an aminoplast precondensate having a crosslinking action.

6. The baking finish of claim 1, wherein the copolymer used has been prepared by solution polymerization.

7. The baking finish of claim 2, wherein component (B) in the copolymer is n-butyl acrylate or 2-ethylhexyl acrylate.

8. The baking finish of claim 2, wherein component (C) in the copolymer is tert.-butyl acrylate, methyl methacrylate or ethyl methacrylate.

9. The baking finish of claim 3, wherein component (C) in the copolymer is tert.-butyl acrylate, methyl methacrylate or ethyl methacrylate.

10. The baking finish of claim 3, wherein component (C) in the copolymer is tert.-butyl acrylate, methyl methacrylate or ethyl methacrylate.

11. The baking finish of claim 1, wherein the Fikentscher K value of the copolymers is from 13 to 15.

12. A solvent solution of the baking finish of claim 1, wherein the solvent is an alcohol, aromatic, ester, ether-ester or a mixture of said solvents.

* * * * *